United States Patent
Koden et al.

[19]

[11] Patent Number: 5,828,434
[45] Date of Patent: Oct. 27, 1998

[54] LIQUID CRYSTAL DISPLAY ELEMENT WITH WALL SHAPED SPACERS FORM BETWEEN ADJACENT TRANSPARENT ELECTRODES AND OVERLAP PORTIONS OF THE LIGHT-SHIELDING ELECTRODE FILMS

[75] Inventors: Mitsuhiro Koden; Kazuhiko Tamai, both of Kashiwa, Japan

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[21] Appl. No.: 742,922

[22] Filed: Nov. 1, 1996

[30] Foreign Application Priority Data

Nov. 6, 1995 [JP] Japan .................... 7-287677

[51] Int. Cl.$^6$ ............ G02F 1/1333; G02F 1/1339; G02F 1/1343

[52] U.S. Cl. ............ 349/148; 349/156; 349/111; 349/110

[58] Field of Search ................... 349/148, 110, 349/111, 155, 156

[56] References Cited

FOREIGN PATENT DOCUMENTS 0209112   1/1987   European Pat. Off. .
0580132   1/1994   European Pat. Off. .

OTHER PUBLICATIONS

U.S. Application Ser. No. 08/743,838, filed Nov. 5, 1996 in the name of Tamai et al.

U.S. Application Ser. No. 08/746,005, filed Nov. 5, 1996 in the name of Tamai et al.

*Primary Examiner*—William L. Sikes
*Assistant Examiner*—Julie Ngo

[57] ABSTRACT

A liquid crystal display element has pairs of light-shielding electrode films, each pair of which are selectively placed without contact with each other between adjacent transparent electrodes on one of the paired substrates along the long sides of each transparent electrode with overlapping portions with the long sides. The light-shielding electrode films have a conductivity, and are effective to reduce the resistance of the transparent electrodes. It also has wall-shaped spacers with a uniform height, each of which is formed between the adjacent transparent electrodes so as to have overlapping portions with the respective light-shielding electrode films. Here, the spacers have an insulating property and a light-shielding property. Moreover, the other portions except for the pixel aperture sections are shielded from light by either the light-shielding electrode films, the spacers, or black matrixes installed on the other substrate. Here, the black matrixes are installed at positions where none of the transparent electrodes, light-shielding electrode films and spacers are formed.

7 Claims, 4 Drawing Sheets

LIQUID CRYSTAL DISPLAY ELEMENT WITH WALL SHAPED SPACERS FORM BETWEEN ADJACENT TRANSPARENT ELECTRODES AND OVERLAP PORTIONS OF THE LIGHT-SHIELDING ELECTRODE FILMS

FIELD OF THE INVENTION

The present invention relates to a liquid crystal display element which has a substrate structure capable of achieving superior shock resistance and good display quality, as well as to a manufacturing method thereof, and concerns a liquid crystal display using such an liquid crystal display element.

BACKGROUND OF THE INVENTION

Conventionally, liquid crystal display elements, which are made by bonding a pair of substrates to each other with their electrode-bearing surfaces facing inside and by sealing liquid crystal into the gap between them, have been well known. In such liquid crystal displays, when the distance between the opposing substrates varies due to deformation of the substrates caused by external pressure or other adverse effects, changes in the threshold-voltage value, shortcircuit in the electrodes between the opposing substrates, disturbance in the orientation of the liquid crystal molecules, etc. tend to occur, thereby making it impossible to provide good display images. For this reason, in order to keep the distance between the paired substrates constant, some methods for placing spacers between the substrates have been suggested; conventionally, either of the following two methods is commonly adopted: (1) a method for spraying spherical particles and (2) a method for forming pillars made of an organic or inorganic material.

Specific examples of the method (1) include a dry method in which spherical fine particles, made of, for example, an organic resin, such as a polymer of divinylbenzenes, are dispersed in a gas flow of nitrogen and then sprayed on the substrates, and a method in which the spherical fine particles are mixed in an alcohol solution or other solutions and sprayed on the substrates in a mist state.

However, method (1) has the following problems: The first problem is that since the fine particles have a coagulating property whereby they coagulate with one another, it is difficult to spray them on the substrates in a uniform manner and consequently to achieve a uniform cell thickness. The second problem is that since it is difficult to control the adherence location of the fine particles, the particles, which have been unintentionally sprayed on pixel portions, tend to cause defects in the orientation, resulting in low display quality. Further, the third problem is that since the substrates are supported by the spherical fine particles that function as spacers only at their contact points, it is difficult to obtain sufficient strength against external pressure.

Moreover, method (2) more specifically refers to a method in which: an organic or inorganic film is formed with a predetermined thickness, a resist film is formed thereon, and exposure is applied thereto in a masked state, thereby forming pillars that function as spacers. Here, instead of the resist film, for example, photosensitive organic resins, such as photosensitive polyimide or photosensitive acryl resins, can be adopted.

As described above, advantages of method (2) are that the pillars can be selectively formed on the outside of the pixels, and that the contact surfaces between the substrates and the pillars can be shaped into a desired pattern. Thus, method (2) is superior in the uniformity of the cell thickness, the strength against external pressure, and display quality, as compared with the method (1).

Recently, ferroelectric liquid crystal has been taken notice of as a prospective liquid crystal material since it has superior properties, such as having spontaneous polarization and providing high-speed responsibility. However, the disadvantage of ferroelectric liquid crystal is that since it has a structure whose molecule-regularity is closer to that of a crystal, once the regularity of the molecule configuration has been disturbed, it is difficult to return to its original state, that is, it is susceptible to shock. For this reason, in order to solve the above-mentioned inherent problem with ferroelectric liquid crystal, it is essential to provide a substrate construction that is superior in shock resistance. In order to provide a method for manufacturing such a liquid crystal display element, the method (2) is considered to be a more prospective candidate than the method (1).

Conventionally, various arrangements have been proposed with respect to liquid crystal display elements in which pillars or other members, made of organic or inorganic materials, are installed as spacers between the substrates by using the above-mentioned method (2). However, as far as high display quality is concerned, the conventional method is not necessarily suitable, and some problems still remain unsolved. The following description will discuss principal prior art arrangements and their inherent problems.

For example, Japanese Laid-Open Patent Publication No. 99384/1981 (Tokukaishou 56-99384) discloses an arrangement wherein spacers made of an insulating material are placed in a region outside the electrodes. The problem with this arrangement is that light leaks from portions that are located within the region outside the electrodes and that have no spacers formed therein, thereby causing reduction in contrast.

In order to solve this problem, Japanese Laid-Open Patent Publication No. 261732/1986 (Tokukaishou 61-261732) discloses an arrangement wherein spacers, which are placed in the region outside the electrodes, are designed to cover gaps between adjacent stripe-shaped transparent electrodes. Moreover, Japanese Laid-Open Patent Publication No. 184519/1986 (Tokukaishou 61-184519) discloses an arrangement wherein spacers are designed so that their edges are virtually coincident with the edges of each pixel. Although these arrangements make it possible to prevent the above-mentioned light leakage, they raise another problem wherein good switching operation is hardly achieved, since liquid crystal molecules in the pixel portion are adversely affected by the insulating material in their switching function when located in the vicinity of the spacers.

Furthermore, Japanese Laid-Open Patent Publication No. 239126/1987 (Tokukaishou 62-239126) discloses an arrangement wherein spacers are placed on the light-shielding layer. Although this arrangement solves the above-mentioned problems, it raises a new problem described below. In recent years, large screen display by the use of liquid crystal display elements is expected to be achieved. However, in order to provide good display on the entire portions of such a large display screen, it is inevitable to reduce resistance of the wiring so as to prevent drop in voltage. In the case when the arrangement disclosed in the above-mentioned Patent Publication is adopted to provide liquid crystal display elements for a large screen, it is necessary to install low-resistance metal wiring or other like members in addition to the transparent electrodes. This results in an increase in the production costs as well as in the number of manufacturing processes.

SUMMARY OF THE INVENTION

The objective of the present invention is to provide a liquid crystal display element and a liquid crystal display which can achieve superior shock resistance as well as high-definition, high-contrast display quality.

In order to achieve the above-mentioned objective, the liquid crystal display element of the present invention, which has a pair of substrates, each having a plurality of transparent electrodes that are placed in parallel with each other, and liquid crystal that is sandwiched by the pair of the substrates, is provided with: a pair of light-shielding electrode films that have a conductive property and a light-shielding property and that is placed between the adjacent transparent electrodes on at least one of the paired substrates along the long sides of each transparent electrode with overlapping portions with the long sides; a wall-shaped spacer with a uniform height that has an insulating property and a light-shielding property and that is formed so as to partially overlap each of the pair of the light-shielding electrode films; and a light-shielding member that is placed on at least one of the paired substrates so as to shield from light at least portions at which none of the transparent electrodes, light-shielding electrode films and spacers are formed.

In the above-mentioned arrangement, the paired substrates, contained in the liquid crystal display element, are allowed to have a uniform gap by the insulating wall-shaped spacer having a uniform height. Further, the substrate strength against external pressure is improved as compared with arrangements using spherical spacers. Moreover, the paired light-shielding electrode films having a conductive property and a light-shielding property, which are placed so as to have overlapping portions with the long sides of each of the transparent electrodes, reduce the resistance of the transparent electrodes, and prevents drop in voltage, thereby achieving a high-definition display. Here, the spacer has a width that is wide enough to partially overlap each of the adjacent light-shielding electrode films, that is, the width that is wider than the gap between the paired light-shielding electrode films and that does not reach each transparent electrode on which the paired light-shielding electrode films overlap each other. In other words, when viewed in a direction parallel to the normal to the substrates, each light-shielding electrode film is interpolated between the pixel aperture section of the transparent electrode and the spacer. Although, at the vicinity of the spacer, display nonuniformity tends to occur due to disturbances in the orientation of liquid crystal, changes in the switching characteristics, and other factors, the light-shielding electrode films shield from light the vicinity of the spacer around the pixel aperture sections as described above; therefore, it becomes possible to prevent these factors from giving adverse effects on display quality of the liquid crystal display element. Moreover, since all the other portions except the pixel aperture sections are shielded from light by any of the light-shielding electrode films, the spacer, and the light-shielding member, it is possible to improve the contrast of the liquid crystal display element. Thus, the above-mentioned arrangement makes it possible to provide a liquid crystal display element which can achieve superior shock resistance as well as high-definition, high-contrast display.

Moreover, when the liquid crystal display element is designed to use ferroelectric liquid crystal, it is possible to provide a further high-definition display, since ferroelectric liquid crystal has superior properties such as high responsibility and bistability. Here, the disadvantage of ferroelectric liquid crystal is that it has a structure which has a higher degree of order in the orientation and is closer to crystal as compared with nematic liquid crystal. Therefore, once the orientation has been disturbed due to external pressure, it is difficult to return to its original state even after the external pressure has been removed. However, since the gap between the paired substrates is positively maintained by the wall-shaped spacer, the shock resistant property of the substrates is improved more highly than that of conventional arrangements using, for example, spherical spacers. Thus, it is possible to prevent the ferroelectric liquid crystal from being affected by external pressure, and consequently to provide a liquid crystal display element which can achieve better display quality.

For a fuller understanding of the nature and advantages of the invention, reference should be made to the ensuing detailed description taken in conjunction with the drawings.

DESCRIPTION OF THE EMBODIMENTS

Embodiment 1

Referring to FIGS. 1, 2, 3 and 4(a) through 4(f), the following description will discuss one embodiment of the present invention.

Figure 1:
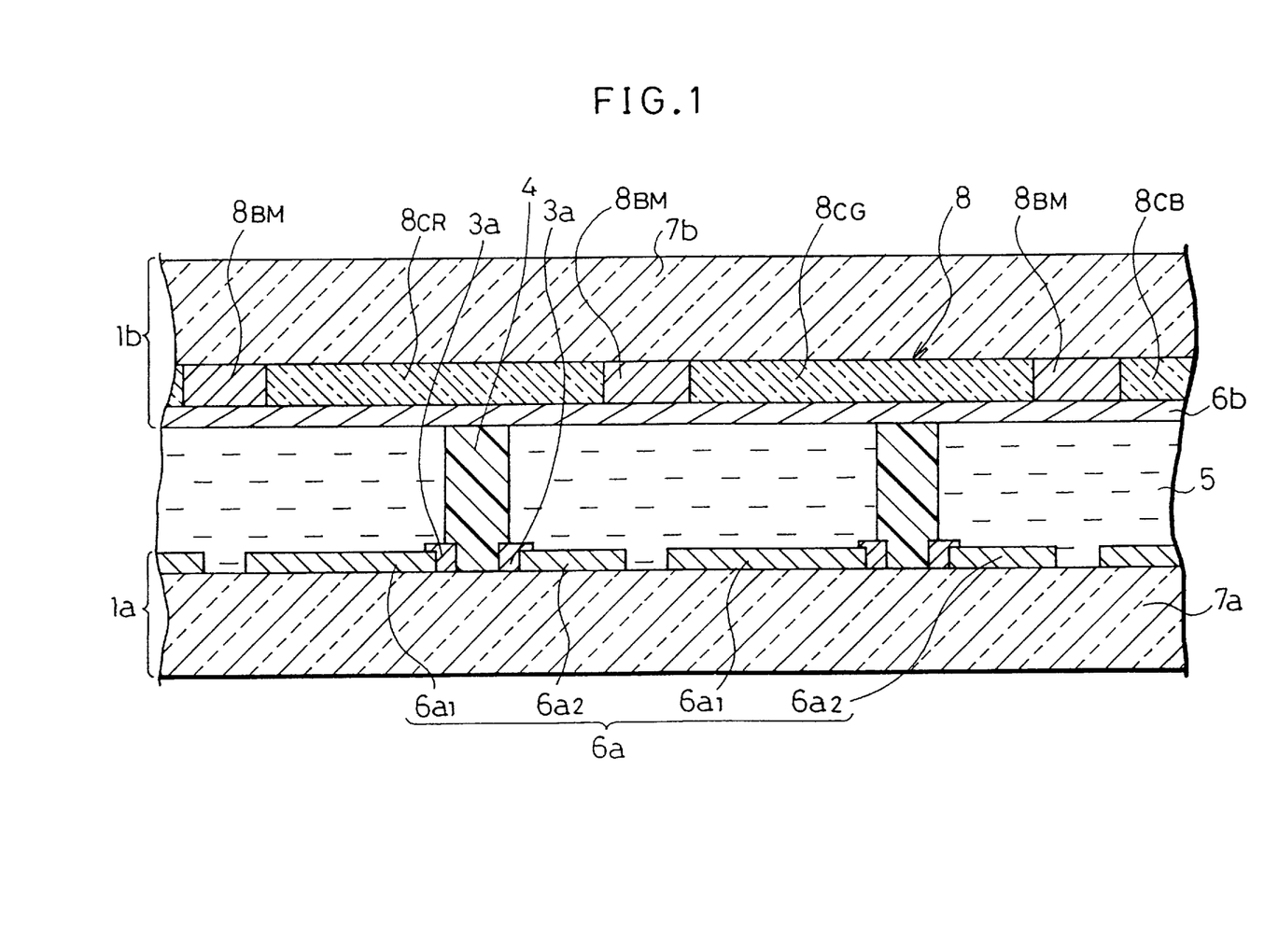
FIG. 1 is a cross-sectional view that shows a schematic construction of a liquid crystal display element of one embodiment of the present invention.

FIG. 1 is a cross-sectional view that shows a schematic construction of a liquid crystal display element of one embodiment of the present invention. As illustrated in FIG. 1, the liquid crystal display element is constituted by a pair of substrates 1a and 1b that are joined to each other by light-shielding wall-shaped spacers 4 with a uniform gap, and liquid crystal 5 that is sandwiched between the substrates 1a and 1b.

The substrate 1a is constituted by an insulating substrate 7a, a group of electrodes 6a that are placed in parallel with one another on the surface of the insulating substrate 7a, and light-shielding electrode films 3a. The group of electrodes 6a is constituted by transparent electrodes $6a_1$ and transparent electrodes $6a_2$ that have respectively different widths and that are alternately arranged. Here, the transparent electrodes $6a_1$ and transparent electrodes $6a_2$ are made of ITO (Indium Tin Oxide).

FIG. 1 indicates a cross-sectional view that is taken along a plane parallel to the short-side direction of the transparent electrodes $6a_1$ and $6a_2$. As illustrated in FIG. 1, on the substrate 1a, the light-shielding electrode films 3a are arranged in every other one of the gaps between the transparent electrodes $6a_1$ and $6a_2$, along the edges of the transparent electrodes $6a_1$ and $6a_2$ in the short-side direction thereof, that is, along the long sides of the transparent electrodes. Here, each light-shielding electrode film 3a has a partially overlapping portion with one of the edges of the transparent electrodes $6a_1$ and $6a_2$ along which it is placed. The light-shielding electrode films 3a are arranged so as not to contact each other. Further, each light-shielding electrode film 3a has a uniform height. Additionally, another film may be placed between each light-shielding electrode film 3a and the corresponding transparent electrode $6a_1$ or $6a_2$; however, it is necessary to provide electrical conduction between each light-shielding electrode film 3a and the corresponding transparent electrode $6a_1$ as well as between each light-shielding electrode film 3a and the corresponding transparent electrode $6a_2$. Consequently, it becomes possible to reduce electric resistance of the transparent electrodes $6a_1$ and $6a_2$.

Figure 2:
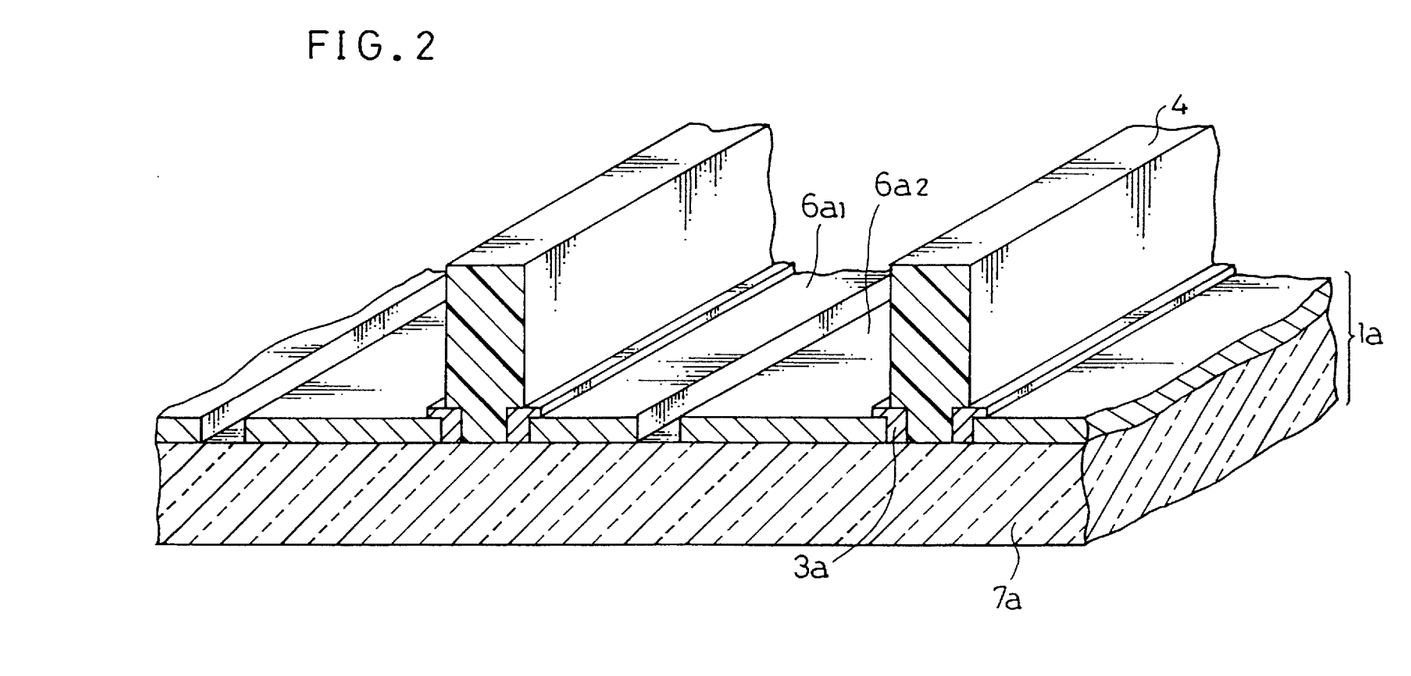
FIG. 2 is a perspective view of a construction including electrodes, light-shielding electrode films and spacers that are formed on one of substrates that is provided in the liquid crystal display element.

FIG. 2 is a perspective view showing a construction of a substrate 1a and spacers 4 that are installed on the substrate 1a. As clearly indicated by FIG. 2, the liquid crystal display element is provided with the light-shielding electrode films 3a that are arranged in every other one of the gaps between the transparent electrodes $6a_1$ and $6a_2$ in the substrate 1a, as described earlier. The wall-shaped spacers 4 each of which has a width slightly wider than the gap between the light-shielding electrode films 3a and a constant height so as to cover the gap therebetween.

Here, each spacer 4 is set to have such a width that it does not completely cover the upper surface of the corresponding light-shielding electrode films 3a and, when viewed in a direction parallel to the normal to the substrate 1a, the light-shielding electrode film 3a is interpolated between the spacer 4 and the corresponding transparent electrode $6a_1$ or $6a_2$. In other words, when viewed in the normal direction to the substrate 1a, pixel portions in the vicinity of the spacers 4 are shielded from light by the light-shielding electrode films 3a; therefore, it is possible to prevent the display quality from being adversely affected by disturbances in the orientation of liquid crystal, ununiformity in the switching characteristics, and other factors that tend to occur in the vicinity of the spacers 4.

As illustrated in FIG. 1, the substrate 1b is provided with an insulating substrate 7b and a group of electrodes 6b that are formed on the insulating substrate 7b in the same manner as the group of electrodes 6a. Further, although not shown in FIG. 1 because the figure indicates a cross section that is taken along a plane in parallel with one transparent electrode belonging to the group of electrodes 6b, light-shielding electrode films are also formed on the substrate 1a with respect to the electrodes of the group of electrodes 6b in the same manner as the light-shielding electrode films 3a on the substrate 1a, thus making it possible to reduce resistance of the group of electrodes 6b.

Moreover, in the substrate 1b, a color filter 8 is installed between the insulating substrate 7b and the group of electrodes 6b. The color filter 8 is constituted by color filter sections $8_{CR}$, $8_{CG}$ and $8CB$ that correspond to the respective colors of R, G and B, and light-shielding black matrix sections $8_{BM}$.

The substrate 1a and the substrate 1b are oriented so that the group of electrodes 6a and the group of electrodes 6b on their surfaces orthogonally intersect each other, and bonded to each other with a uniform gap maintained by the spacers 4. Moreover, as illustrated in FIG. 1, the black matrix sections $8_{BM}$ of the color filter 8 on the substrate 1b are placed at positions so as to shield from light the positions, other than pixel regions, at which neither the light-shielding electrode films 3a nor the spacers 4 are installed. In other words, when viewed in a direction parallel to the normal to the substrates 1a and 1b, since all the other portions except the pixels are shielded from light by any of the light-shielding electrode films 3a, the spacers 4 and the black matrix sections $8_{BM}$, it is possible to achieve good display quality with high contrast and without nonuniformity.

Conventionally, arrangements which use only the black matrix sections or only the light-shielding spacers to shield from light regions other than the pixels have been proposed; however, these conventional arrangements tend to cause narrow pitches in the light-shielding sections, resulting in a reduction in the aperture rate. In contrast, it becomes possible to improve the aperture rate by shielding from light the regions other than the pixels using the black matrix sections $8_{BM}$ of the color filter 8, the light-shielding electrode films 3a and the spacers 4 in combination, as described above.

Additionally, in FIGS. 1 and 2, an insulating film for preventing short circuit between the upper and lower substrates, an alignment film for aligning the liquid crystal molecules, and other films are omitted from the drawings for sake of clarity; however, these films may be formed on demand and are shown, for example, in FIGS. 4(a)–4(f) discussed below. Further, an overcoat layer or other layers may be placed between the color filter 8 and the group of electrodes 6b on the substrate 1b.

Figure 3:
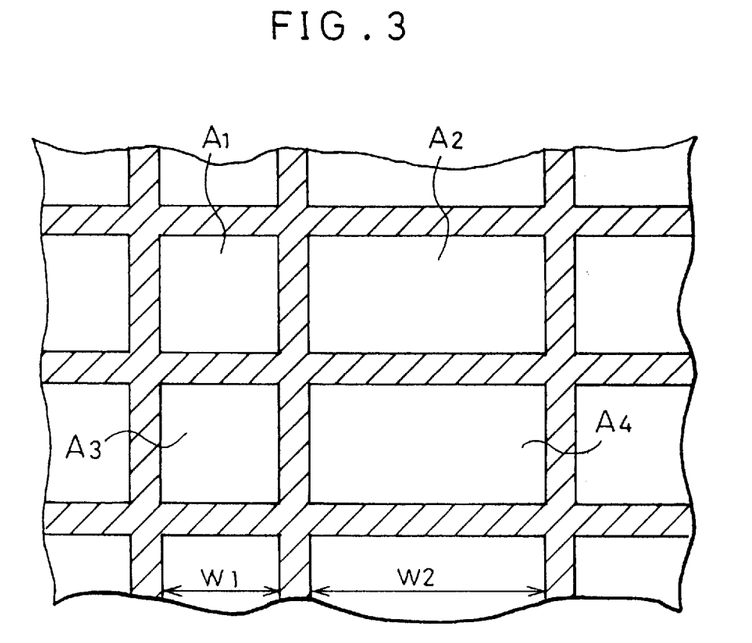
FIG. 3 is a plan view showing a pixel and light-shielding portions of the liquid crystal display element.

Moreover, at least one of the groups of electrodes 6a and 6b that are respectively installed on the paired substrates 1a and 1b of the present liquid crystal display element is designed to have transparent electrodes that are alternately arranged with respectively different widths. In this arrangement, each pixel is constituted by four regions $A_1$ through $A_4$, for example, as shown in FIG. 3. Here, FIG. 3 is a plan view that is obtained when the liquid crystal display element of FIG. 1 is viewed from above in a direction parallel to the normal to the substrate 1b. The regions $A_1$ through $A_4$ represent aperture sections, and shaded portions in the figure represent portions from which light is shielded by the black matrix sections $8_{BM}$ of the color filter 8 or by the light-shielding electrode films 3a and the spacers 4. Further, in the regions $A_1$ through $A_4$, the ratio of the widths of the aperture sections $W_1:W_2$ is virtually represented by 1:2.

With this arrangement, display with four gray scales is available by selectively changing the regions $A_1$ through $A_4$ to the bright state or dark state respectively in accordance with image signals. For example, in the case of the normally black mode, display with four gray scales is available by selecting any of the four kinds of display states, that is, (1) dark display states in all the regions, (2) a bright display state only in the region $A_1$, (3) a bright display state only in the region $A_4$, and (4) bright display states in all the regions, in accordance with image signals. Further, since any of the color filter sections $8_{CR}$, $8_{CG}$ and $8_{CB}$ is allocated to each pixel, the present liquid crystal display element is capable of providing display with 64 colors by combining the gray scales and colors. Additionally, the above-mentioned display with four gray scales is merely described as one example, and various methods may be adopted with respect to division methods for each pixel, selection methods for providing the bright display state in accordance with respective gray scales, and other methods. Moreover, the normally white mode may be adopted instead of the normally black mode.

Here, the insulating substrates 7a and 7b, shown in FIG. 1, are made of, for example, a transparent material, such as glass or plastic; however, either of these substrates may be constituted of an opaque material. In such a case, for example, substrates, such as a silicon wafer coated with an insulating film and a glass substrate with an opaque film formed on its surface, may be adopted.

Furthermore, it is necessary for the edge of each spacer 4 to have an overlapping portion with the corresponding light-shielding electrode film 3a. In the case when these two members do not overlap each other, light leaks from non-overlapping portions, thereby causing a decrease in contrast. In addition, it is necessary for each spacer 4 not to overlap the transparent electrode $6a_1$ or $6a_2$. In the case when the spacer 4 overlaps the transparent electrode $6a_1$ or $6a_2$, the spacer 4 tends to give adverse effects on the orientation and switching capability of liquid crystal molecules in the pixel portion, resulting in degradation in display quality.

With respect to materials of the spacers 4, for example, insulating substances, such as photosensitive polyimide resin, photosensitive acryl resin, photoresist, $SiO_2$ and photopolymerizable high polymer, may be adopted. Additionally, when photopolymerizable high polymer is used, the manufacturing processes of the liquid crystal display element is different from those using the other materials; the manufacturing processes of the respective cases will be described later. With respect to the liquid crystal 5, various liquid crystal materials, such as nematic liquid crystal, ferroelectric liquid crystal or antiferroelectric liquid crystal, may be adopted.

Moreover, the above-mentioned description exemplifies an arrangement wherein a light-shielding portion is formed between the paired transparent electrodes $6a_1$ and $6a_2$ in the substrate 1a by using the light-shielding electrode films 3a and the spacer 4 and a portion, which is to be shielded from light but is not shielded by either of the light-shielding electrode films 3a and the spacer 4, is shielded from light by the black matrix section $8_{BM}$ that is installed in the color filter 8 on the substrate 1b. Among the combinations of arrangements of the light-shielding electrode film 3a, the spacer 4 and the black matrix section $8_{BM}$, the combination shown in FIG. 1 merely provides one example. However, when the light-shielding portion is formed only by the black matrix or only by the spacer, the pitches are narrowed and the aperture rate is reduced in most cases. Therefore, it is preferable to form light-shielding portions by properly combining the light-shielding electrode films 3a, the spacers 4 and the black matrix sections $8_{BM}$.

Referring to FIGS. 4(a) through 4(f), the following description will discuss manufacturing processes of another example of the liquid crystal display element of the present invention. Here, in the manufacturing processes to be described below, the process for forming the color filter 8 is omitted from the explanation.

Figure 4A:
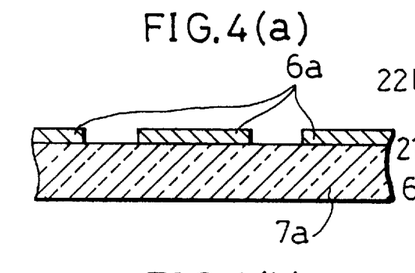
FIGS. 4(a) through 4(f) are cross-sectional views of constructions of the liquid crystal display element that are indicated in order of manufacturing processes.

First, an ITO film with a film thickness of 1000 Å is formed on an insulating substrate 7a by the sputtering method, and as illustrated in FIG. 4(a), a group of electrodes 6a, made of ITO, are formed by the photolithography with a predetermined pattern.

Figures 4B, 4C, 4F:
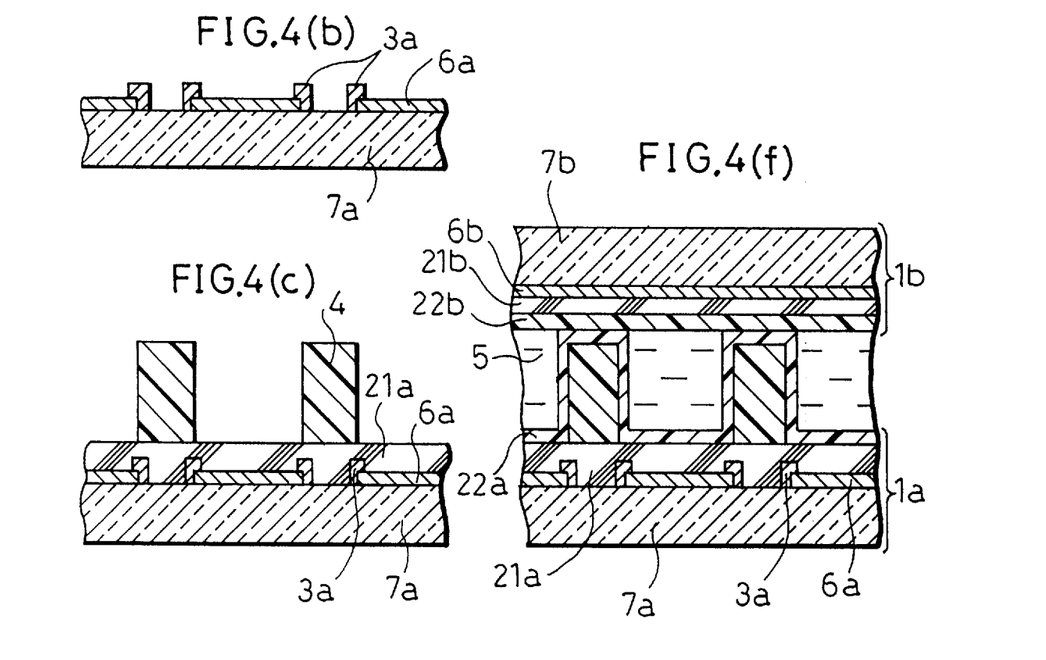

On this is formed a molybdenum film by the sputtering method with a film thickness of 1000 Å, and as illustrated in FIG. 4(b) light-shielding electrode films 3a are formed with a predetermined pattern.

Further, $SiO_2$ is formed as a film with a film thickness of 2000 Å so as to provide an insulating film 21a, and on this is further formed a negative-working photosensitive acryl resin with a film thickness of 1.5 μm, and then the resin is exposed by the use of photomasks, and developed. Thus, as illustrated in FIG. 4(c), wall-shaped spacers, which are aligned in the lengthwise direction of the group of electrodes 6a, are formed. Here, each spacer 4 has an overlapping portion with each of the adjacent paired light-shielding electrode films 3a between the adjacent electrodes.

Figure 4D:
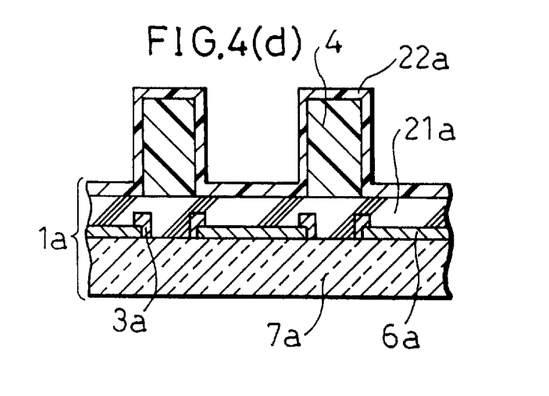

Next, as illustrated in FIG. 4(d), polyimide resin with a film thickness of 500 Å is formed on the surfaces of the insulating film 21a and the spacers 4, and the surface of this film is subjected to a rubbing process so as to form an alignment film 22a.

Figure 4E:
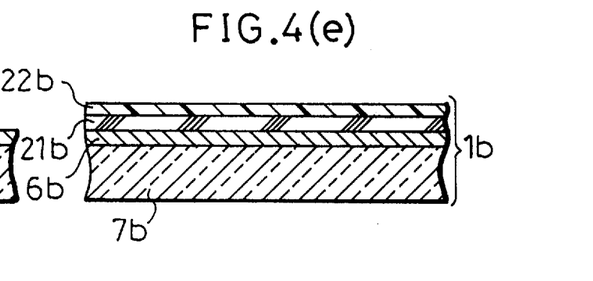

On the other hand, a substrate 1b, which faces the substrate 1a, is manufactured through the following processes. First, an ITO film with a film thickness of 1000 Å is formed on an insulating substrate 7b by the sputtering method, and a group of electrodes 6b are formed by subjecting the ITO film to a photolithography process. On this is formed $SiO_2$ as a film with a film thickness of 2000 Å so as to provide an insulating film 21b, and this film is coated with polyimide resin with a film thickness of 500 Å and the surface of this film is subjected to a rubbing process so as to form an alignment film 22b. Consequently, the substrate 1b, which has a layer structure as shown in FIG. 4(e), is manufactured.

Next, the substrate 1a and the substrate 1b are oriented so that the group of electrodes 6a and the group of electrodes 6b on their surfaces orthogonally intersect each other, and bonded to each other, and liquid crystal 5 is injected into the gap between them, thereby forming a liquid crystal layer. Thus, a liquid crystal display element as shown in FIG. 4(f) is manufactured through the above-mentioned processes.

In the case when photopolymerizable high polymer is used as the material of the spacers 4, the groups of electrodes 6a and 6b and the light-shielding electrode films 3a are formed on the surfaces of the insulating substrates 7a and 7b in the same methods as described above, and the insulating films 21a and 21b as well as the alignment films 22a and 22b are formed, if necessary; thus, the substrates 1a and 1b are manufactured. After the substrates 1a and 1b have been bonded to each other in the same manner as described above, a mixture of a liquid crystal material and photopolymerizable monomer is injected into the gap between the substrates 1a and 1b, and light irradiation is applied thereto by using a photomask having a predetermined pattern. Thus, the photopolymerizable monomer is photopolymerized at portions irradiated with light so that spacers 4 are formed with a predetermined pattern.

As described above, in the liquid crystal display element of the present invention, the following components are provided: transparent electrodes $6a_1$ and $6a_2$ that are placed in parallel with each other in the substrate 1a that is one of the paired opposing substrates; a pair of light-shielding electrode films 3a, one of which is installed between the transparent electrodes $6a_1$ and $6a_2$ in a manner so as to overlap each transparent electrode $6a_1$ along one long side of the transparent electrodes $6a_1$, and the other of which is likewise installed in a manner so as to overlap each transparent electrode $6a_2$ along one long side of the transparent electrode $6a_2$; and wall-shaped spacers 4 each of which covers the gap between the light-shielding electrode films 3a and has a uniform height.

Each of the spacers 4 is formed into a continuous wall shape extending in the lengthwise direction of the transparent electrodes $6a_1$ and $6a_2$ with a uniform height. Therefore, as compared with arrangements using spherical spacers, the paired substrates 1a and 1b, when bonded to each other, are allowed to have a more uniform cell thickness, and the liquid crystal display element is allowed to have an improved substrate strength against external pressure. Thus, even in the case when, for example, ferroelectric liquid crystal is used as the liquid crystal 5, the firmness of the substrate structure makes it possible to alleviate the disadvantage of ferroelectric liquid crystal, that is, the susceptibility to external pressure. Consequently, it becomes possible to provide a liquid crystal display element which can achieve high-definition display by utilizing superior characteristics of ferroelectric liquid crystal, such as high responsibility and bistability in molecular orientation.

Further, since the wall-shaped spacers 4 are precisely formed on the outside of the pixels, it is possible to eliminate conventional problems such as defects in the orientation that are caused by spherical particles which have been unintentionally put into the inside of pixels when they have been sprayed.

Moreover, since the light-shielding electrode films 3a are made of a material having a light-shielding property as well as a conductive property so that they are electrically conductive to the transparent electrodes $6a_1$ and $6a_2$, it is possible to reduce the resistance of the transparent electrodes $6a_1$ and $6a_2$. With this arrangement, it becomes possible to provide a liquid crystal display element which can achieve high-definition, high contrast display even when used in large screens.

Here, the present invention is not intended to be limited by the above-mentioned embodiments, and various modifications thereof would be made within the scope of the invention. For example, in the above-mentioned embodiments, explanations have been given by exemplifying a case wherein the light-shielding electrode films 3a and the wall-shaped spacers 4 are arranged in every other one of the gaps between the transparent electrodes $6a_1$ and $6a_2$; however, the frequency of formation of the spacers may be more than or, in contrast, less than that of this case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element, which has a pair of substrates, each having a plurality of transparent electrodes that are placed in parallel with each other, and liquid crystal that is sandwiched by the pair of the substrates, comprising:

a pair of light-shielding electrode films that have a conductive property and a light-shielding property and that is placed between the adjacent transparent electrodes on at least one of the pair of the substrates along the long sides of each transparent electrode with overlapping portions with the long sides;

a wall-shaped spacer with a uniform height that has an insulating property and a light-shielding property and that is formed so as to partially overlap each of the pair of the light-shielding electrode films; and a light-shielding member that is placed on at least one of the pair of the substrates so as to shield from light at least portions at which none of the transparent electrodes, light-shielding electrode films and spacers are formed.

2. The liquid crystal display element as defined in claim 1, wherein the liquid crystal comprises ferroelectric liquid crystal.

3. A liquid crystal display comprising the liquid crystal display element as defined in claim 1, wherein:

the plurality of the transparent electrodes are constituted of transparent electrodes of at least two types that have respectively different widths, the plurality of the transparent electrodes being installed at least either of the pair of the substrates in the liquid crystal display element;

one pixel is formed by a plurality of intersecting regions where each transparent electrode on one of the pair of the substrates intersects each transparent electrode on the other of the pair of the substrates; and wherein the light-transmitting characteristics of liquid crystal at the plurality of the intersecting regions are selectively controllable in accordance to gradation scales to be displayed by the pixels.

4. A manufacturing method of a liquid crystal display element comprising the steps of:

forming transparent electrodes on an insulating substrate;

forming a material having a conductive property and a light-shielding property as a film and patterning the film so as to provide a pair of light-shielding electrode films, the pair being placed between the adjacent transparent electrodes along the long sides of each transparent electrode with overlapping portions with the long sides; and forming a material having an insulating property and a light-shielding property as a film and patterning the film so as to provide a wall-shaped spacer that partially overlaps each of the pair of the light-shielding electrode films.

5. The manufacturing method of a liquid crystal display element as defined in claim 4, further comprising the step of:

prior to the step for forming the spacer, forming an insulating film on the insulating substrate on which the transparent electrodes and the light-shielding electrode films have been formed.

6. The manufacturing method of a liquid crystal display element as defined in claim 4, wherein, in the step for forming the spacer, a negative-working photosensitive resin is used as a material of the spacer and a photolithography method is used for forming the spacer.

7. A manufacturing method of a liquid crystal display element comprising the steps of:

forming transparent electrodes on the pair of the insulating substrates respectively;

forming a material having a conductive property and a light-shielding property as a film and patterning the film so as to provide a pair of light-shielding electrode films, the pair being placed between the adjacent transparent electrodes along the long sides of each transparent electrode with overlapping portions with the long sides;

bonding the pair of the insulating substrates to each other with surfaces thereof that bear the transparent electrodes facing each other, and then introducing a mixture of a liquid crystal material and photopolymerizable monomer into a gap between the pair of the insulating substrates, and polymerizing the photopolymerizable monomer by light irradiation using a photomask so as to provide a wall-shaped spacer that partially overlaps each of the pair of the light-shielding electrode films.

* * * * *

UNITED STATES PATENT AND TRADEMARK OFFICE
CERTIFICATE OF CORRECTION

PATENT NO. : 5,828,434
APPLICATION NO. : 08/742922
DATED : October 27, 1998
INVENTOR(S) : Mitsuhiro Koden and Kazuhiko Tamai It is certified that error appears in the above-identified patent and that said Letters Patent is hereby corrected as shown below:

On the Title Page, Item (56), References Cited, FOREIGN PATENT DOCUMENTS insert:
--5699384    8/1981     Japanese Pat. Off.
  679121     10/1994    Japanese Pat. Off.
  61184519   8/1986     Japanese Pat. Off.
  61261723   11/1986    Japanese Pat. Off.
  62239126   10/1987    Japanese Pat. Off.--

Signed and Sealed this

Eighteenth Day of May, 2010

David J. Kappos
*Director of the United States Patent and Trademark Office*